March 18, 1952  A. W. BACHMAN  2,589,325
BARROW ATTACHMENT FOR LAWN MOWERS
Filed April 19, 1949
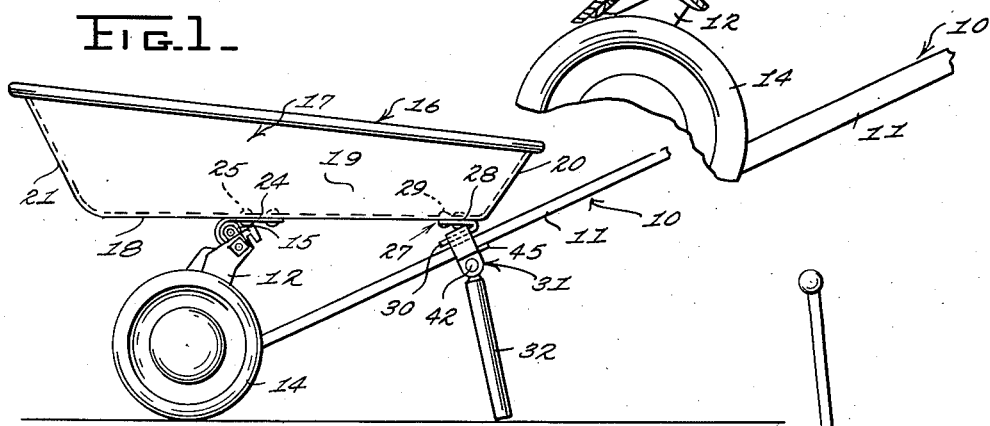
INVENTOR.
ALBERT W. BACHMAN
BY
McMorrow, Berman + Davidson
ATTORNEYS Patented Mar. 18, 1952

2,589,325

UNITED STATES PATENT OFFICE 2,589,325

BARROW ATTACHMENT FOR LAWN MOWERS

Albert W. Bachman, Parma, Ohio

Application April 19, 1949, Serial No. 88,309

2 Claims. (Cl. 280—51)

This invention relates to a lawn mower wheelbarrow combination, and more particularly to a tub or wheelbarrow body formed for removable engagement with the handle and roller of a lawn mower.

It is an object of this invention to provide a device of the kind to be more particularly described hereinafter capable of performing most of the average carrying or hauling jobs around the home and formed for low cost manufacture.

Another object of this invention is to provide a wheelbarrow attachment for a lawn mower engageable with the roller and handle bar of the mower in such a manner that no modification or change in the structure or formation is necessary to obtain the conversion or attachment.

The tub, when attached to the mower, will provide a wheelbarrow which is easy to balance, steer and pivot because of the two-wheel suspension provided by the mower.

Still another object of this invention is to provide a light-weight, sturdy attachment which is readily and easily attached to a lawn mower of any present conventional structure. The attachment is quite as readily detached from the mower to be stored away when the mower is to be used as a cutter.

With the above and other objects in view, my invention consists in the arrangement, combination and details of construction disclosed in the drawings and specification, and then more particularly pointed out in the appended claims.

In the drawings:

Figure 1 is a side elevation of the wheelbarrow attachment constructed according to an embodiment of my invention, secured on the handle and roller of an inverted lawn mower;

Figure 2 is a bottom plan view of the wheelbarrow attachment removed from the lawn mower;

Figure 3 is a side elevation of the lawn mower and wheelbarrow attachment, showing the lawn mower in the raised position for discharging the material or load from the wheelbarrow or tub body;

Figure 4 is a perspective view of the bracket and supporting member for attachment to the handle of the lawn mower;

Figure 5 is a fragmentary detail section showing the engagement of the front hook of the wheelbarrow body with the transverse roller of the lawn mower.

Referring to the drawings, the numeral 10 designates generally a conventional lawn mower including a wheeled truck and having a longitudinally extending elongated handle 11 secured to said truck. Specifically, the handle 11 is fixed on the side plates 12 of the lawn mower at the lower end thereof. The side plates 12 provide the bearings for the wheel axle, not shown in the drawings, the wheels 14 being rotatably supported on the outer sides of the side walls or plates 12. Being of conventional formation, the lawn mower 10 includes a transverse roller 15 adjustably mounted on the lower end thereof at the rear ends of the side plates 12, rearwardly of the cutting blades, not shown in the drawings.

The wheelbarrow attachment 16 constructed according to an embodiment of this invention is adapted to be secured to the handle 11 and to the roller 15 of the inverted lawn mower 10. The wheelbarrow attachment 16 is formed of a substantially conventional wheelbarrow body 17 open at the top thereof and having a bottom wall 18, side walls 19, a rear end wall 20 and a forward end wall 21. The end walls 20 and 21 are inclined downwardly and inwardly from the upper edge of the open upper end of the body 17 engaging or formed integrally with the bottom wall 18. In the preferred form of the body 17, the walls 19, 20 and 21 are formed from a single piece of flat sheet material stamped to the desired configuration. As in most types of wheelbarrow bodies, the rear wall 20 is shorter than the front wall 21, as the wheelbarrow body is normally transported or moved about with the upper edge thereof in a substantially horizontal position. In the rest position of the wheelbarrow, the bottom wall 18 is disposed in a horizontal position and therefore to conform to the requirements of the use of a wheelbarrow, the side walls 19 are tapered from a narrow rear end to an enlarged or widened front end. In order to easily slide or discharge the material from within the body 17, the front wall 21 is inclined downwardly and inwardly toward the front end of the bottom wall 18 so that when the rear end of the body 17 is raised, the material resting on the bottom 18 will be slidably removed from the forward or upper edge of the front wall 21, as shown in Figure 3 of the drawings.

A pair of hooks 22 are fixed to the bottom wall 18 on the lower side thereof intermediate the length thereof a short distance forwardly of the longitudinal center. The hooks 22 include a substantially horizontal shank 24 which is adapted to be secured to the bottom wall 18 by rivets 25 or other suitable fastening means. A bill 26 is formed integrally with the forward end of the shank 24 on each of the hooks 22 and is extended downwardly and rearwardly, the forward portions of the bills 26 being arcuate in configuration having the concave sides thereof facing rearwardly along the length of the body 17. The radius of each of the arcuate bills 26 is substantially equal to the outside diameter of the roller 15 of the lawn mower and the length of each of the bills 26 is such as to extend about the outside forward surface of the roller 15 terminating at a point slightly forwardly of the axis thereof, as shown in Figure 5 of the drawings. The hook 22 is formed of metal or other suitable, substantially resilient material to provide for the resilient engagement of the bill 26 about the roller 15 when the wheelbarrow attachment 16 is secured to the lawn mower.

A rear hook 27 is secured to the rear end of the bottom wall 18 and is formed with a longitudinally-extending shank 28 which is secured to the bottom wall 18 by rivets 29 or other suitable fastening devices. The shank 28 is bent at the rear end thereof to form a forwardly-extending, downwardly and forwardly-inclined bill 30. The bill 30 is flat in configuration extending forwardly of the body 17 confronting the rearwardly-extending bills 26 of the front hooks 22.

A bracket 31 is fixed along the length of the handle 11 for securing the rear hook 27 to the handle and for supporting the swingable supporting leg or member 32.

The bracket 31 is formed of a U-shaped strap of metal having a bight portion 34 and a pair of depending legs or arms 35 and 36 extending downwardly from the opposite ends of the bight portion 34. A transverse plate 37 is fixed between the side arms 35 and 36 adjacent the bight 34, spaced downwardly therefrom, defining a slot or opening 38 therebetween. The side arms 35 and 36 are formed with inwardly-extending flanges 39 adjacent the lower ends thereof, the space between the flanges 39 and the transverse, intermediate bar 37 defining the space 40 within which the handle 11 is adapted to be clampingly engaged. The arms 35 and 36 are continued downwardly from the inside edges of the flanges 39 forming the lower straps or tabs 41 at the terminal ends thereof. A pivot pin 42 is engaged between the extreme lower ends of the side arms 35 and 36, extending through the tabs 41 transversely of the bracket 31. The supporting member 32 is formed of an elongated member having an eye or bearing member 44 fixed to the upper end thereof. The pivot pin 42 is adapted to be extended through the bearing 44 for rockably supporting the member 32 thereon.

A stop element or member 45 is carried by the bearing 44 on the upper edge thereof above the pivot 41 and is adapted to be extended rearwardly along the length of the handle 11 when the bracket 31 is secured or mounted thereon. The stop element 41 is adapted to engage the under side of the handle 11 for limiting the rearward rocking movement of the supporting member 32 to a substantially vertical position, as shown in Figure 1 of the drawings, for supporting the wheelbarrow attachment in the rest position. With the supporting member 32 engaging the ground and supporting the handle in a raised position, the wheelbarrow body 17 is supported in a rest or substantially horizontal position in substantially the same manner and disposition as the conventional type of wheelbarrows. When the lawn mower handle 11 is raised for dumping material from the body 17, or for transporting material, the supporting member 32 will swing forwardly, due to its own weight, about the pivot pin 42 in the manner clearly shown in Figure 3 of the drawings.

In the use and operation of the wheelbarrow attachment described above, the bracket 31 is initially engaged on the handle 11 intermediate the length thereof with the slot 38 disposed on the upper side of the inverted wheelbarrow handle 11. When the bracket 31 is properly positioned along the length of the handle 11, the bill portion 31 of the rear hook 27 may be slidably engaged through the rear edge of the slot or passage 38 for securing the rear hook 27 to the bracket 31. In this position, the lower edges of the hooks 22 will engage the upper surface of the roller 15, which is mounted transversely of the handle 11 at the lower end thereof. By pressing downwardly on the wheelbarrow body 17, the bill portions 26 will be resiliently engaged about the forward surface of the roller, the roller rotating on its axis as the bills 26 are moved downwardly over the forward edge thereof. When the arcuate bills 26 are seated on the forward edge of the roller 15, the resiliency of the hooks 22 will press the extreme lower edges of the bills 26 downwardly and rearwardly over the forward surface of the roller 15 for securely mounting the body 17 on the inverted lawn mower 10. In this position of the attachment 16, the wheels 14 of the lawn mower 10 will provide the suitable wheels for moving the lawn mower with the wheelbarrow attachment mounted thereon with a load in the wheelbarrow body 17.

I do not mean to confine myself to the exact details of construction herein disclosed, but claim all variations falling within the purview of the appended claims.

I claim:

1. In a lawn mower including a wheeled truck and a wheelbarrow body pivotally supported on said truck, means for hitching said wheelbarrow body to a handle operatively connected to said wheeled truck, said means comprising a U-shaped bracket circumposed about said handle and clampingly secured thereto, a transverse bar disposed within said bracket adjacent to and spaced from the bight thereof to thereby form a slot, opposed flanges on the free ends of the legs of said bracket and forming with said bar and legs a space through which the adjacent portion of said handle extends, a pair of straps dependingly carried by said flanges, a supporting leg interposed between said straps and having one end pivotally secured in said straps, and a hook carried by the bottom of said wheelbarrow body and engageable in said slot to thereby detachably secure said wheelbarrow body to said handle.

2. In a lawn mower including a wheeled truck and a wheelbarrow body pivotally supported on said truck, means for hitching said wheelbarrow body to a handle operatively connected to said wheeled truck, said means comprising a U-shaped bracket circumposed about said handle and clampingly secured thereto, a transverse bar disposed within said bracket adjacent to and spaced from the bight thereof to thereby form a slot, opposed flanges on the free ends of the legs of said bracket and forming with said bar and legs a space through which the adjacent portion of said handle extends, a pair of straps dependingly carried by said flanges, a supporting leg interposed between said straps and having one end pivotally secured in said straps, a hook carried by the bottom of said wheelbarrow body and engageable in said slot to thereby detachably secure said wheelbarrow body to said handle, and a stop member on said one end of said supporting leg and engageable with said handle for limiting the pivotal movement of said leg.

ALBERT W. BACHMAN.

REFERENCES CITED

The following references are of record in the file of this patent:

UNITED STATES PATENTS

| Number | Name | Date |
|---|---|---|
| 355,245 | Annin | Dec. 28, 1886 |
| 452,969 | O'Neill | May 26, 1891 |
| 888,055 | Baker | May 19, 1908 |
| 1,338,144 | McNeill | Apr. 27, 1920 |
| 2,242,710 | Loomis | May 20, 1941 |
| 2,320,387 | Schroeder | June 1, 1943 |
| 2,326,739 | Andrews | Aug. 7, 1943 |

FOREIGN PATENTS

| Number | Country | Date |
|---|---|---|
| 36,085 | Austria | Feb. 10, 1909 |
| 177,599 | Great Britain | Mar. 29, 1922 |
| 454,733 | Germany | Jan. 17, 1928 |
| 631,325 | France | Sept. 12, 1927 |